United States Patent
Austin

(10) Patent No.: US 7,281,747 B2
(45) Date of Patent: Oct. 16, 2007

(54) TAILGATE COUNTERBALANCING HINGE

(75) Inventor: Donald Mossom Austin, Perkinsfield (CA)

(73) Assignee: M&C Corporation, Sterling Heights, MI (US)

( * ) Notice: Subject to any disclaimer, the term of this patent is extended or adjusted under 35 U.S.C. 154(b) by 0 days.

(21) Appl. No.: 11/443,082

(22) Filed: May 31, 2006

(65) Prior Publication Data

US 2006/0214454 A1 Sep. 28, 2006

Related U.S. Application Data

(63) Continuation-in-part of application No. 11/075,757, filed on Mar. 10, 2005, now Pat. No. 7,195,300, and a continuation-in-part of application No. 11/216,082, filed on Sep. 1, 2005.

(60) Provisional application No. 60/608,632, filed on Sep. 10, 2004, provisional application No. 60/552,063, filed on Mar. 10, 2004.

(51) Int. Cl.
*B60P 1/267* (2006.01)
(52) U.S. Cl. .......................... 296/50; 296/53; 296/57.1
(58) Field of Classification Search ............... 296/50, 296/53, 57.1, 59, 146.1; 16/75, 308; 49/386, 49/389
See application file for complete search history.

(56) References Cited

U.S. PATENT DOCUMENTS

| | | | |
|---|---|---|---|
| 2,395,456 A | 2/1946 | Bunker | |
| 2,733,476 A | 2/1956 | Eck | |
| 2,799,891 A | 7/1957 | Ragsdale | |
| 2,810,153 A | 10/1957 | Semar | |
| 2,984,517 A | 5/1961 | Farrow et al. | |
| 3,031,225 A | 4/1962 | Saffer et al. | |
| 3,085,286 A | 4/1963 | Whitehouse et al. | |
| 3,122,775 A | 3/1964 | Pulleyblank | |
| 3,146,847 A | 9/1964 | Rutman et al. | |
| 3,166,783 A | 1/1965 | Mackie et al. | |
| 3,336,070 A | 8/1967 | Jackson | |
| 3,370,317 A | 2/1968 | Marchione | |
| 3,402,508 A | 9/1968 | Kessler | |
| 3,643,378 A | 2/1972 | Velavicius et al. | |
| 3,649,067 A | 3/1972 | Louton, Jr. | |
| 3,695,678 A | 10/1972 | Gergoe | |
| 3,699,716 A | 10/1972 | Wanlass | |
| 3,787,923 A | 1/1974 | Peterson | |
| 4,143,904 A | 3/1979 | Cooper et al. | |
| 4,291,501 A | 9/1981 | Steinberg et al. | |

(Continued)

*Primary Examiner*—Lori L. Lyjak
(74) *Attorney, Agent, or Firm*—Nixon & Vanderhye P.C.

(57) ABSTRACT

A tailgate counterbalancing hinge assembly includes a linear torque rod, a first end assembly and a second end assembly secured to the torque rod. The assemblies are easily mounted in the vehicle by means of brackets secured to the tailgate. The first end assembly pivotally supports the tailgate while permitting a torque rod end to be rigidly coupled to the tailgate for movement with the tailgate about a pivot axis. The first assembly includes a body bracket with an elongated key slot that receives an elongated key of a pivot coupling having an opening for receiving a first end of the torque rod. The second end assembly also pivotally supports the tailgate and permits the other end of the torque rod to be rigidly connected to the vehicle body. The second assembly includes a vehicle body hinge pin, and combines bushings with an aligned, elongated key to simplify installation and removal of the counterbalancing hinge assembly.

23 Claims, 2 Drawing Sheets

U.S. PATENT DOCUMENTS

| | | |
|---|---|---|
| 4,378,658 A | 4/1983 | DeLorean |
| 4,589,164 A | 5/1986 | Leonard |
| 4,701,977 A | 10/1987 | Hori et al. |
| 4,702,511 A | 10/1987 | Olins |
| 4,787,809 A | 11/1988 | Zroslik |
| 4,845,811 A | 7/1989 | Fargnier |
| 4,905,347 A | 3/1990 | Worth |
| 5,039,154 A | 8/1991 | Lewis |
| 5,358,301 A | 10/1994 | Konchan et al. |
| D370,453 S | 6/1996 | Shortman et al. |
| 5,606,773 A | 3/1997 | Shappell |
| 5,641,262 A | 6/1997 | Dunlop et al. |
| 5,787,549 A | 8/1998 | Soderlund |
| 5,988,724 A | 11/1999 | Wolda |
| 6,283,463 B1 | 9/2001 | Park |
| 6,769,729 B1 | 8/2004 | Bruford et al. |
| 6,793,263 B1 | 9/2004 | Bruford et al. |
| 6,846,030 B2 | 1/2005 | Koehler et al. |
| 6,874,837 B2 | 4/2005 | Bruford et al. |
| 6,905,156 B2 | 6/2005 | Miller et al. |

TAILGATE COUNTERBALANCING HINGE

RELATED APPLICATIONS

This application is a continuation-in-part of U.S. application Ser. No. 11/075,757 filed Mar. 10, 2005 now U.S. Pat. No. 7,195,300, which claim the benefit of Provisional Application Ser. No. 60/552,063, filed Mar. 10, 2004, and U.S. application Ser. No. 11/216,082, filed Sep. 1, 2005, which claims the benefit of Provisional Application Ser. No. 60/608,632, filed Sep. 10, 2004, the entire contents of such applications being incorporated in this application by reference.

FIELD OF THE INVENTION

The present invention relates to vehicle body closure panels with a counterbalancing hinge assembly having a torque rod with end assemblies forming a pivot connection between the closure panel and vehicle body pillars using keys designed to carry the closure panel and define an unbiased tailgate position permitting the closure panel to be removed from the vehicle body.

BACKGROUND OF THE INVENTION

Vehicle body closure panels, such as a tailgate, are pivotally mounted between body side panels forming the pillars at the rear of the vehicle. The tailgate pivots about a hinge axis between a horizontal, open position and a vertical, closed position. Preferably, the mounting assemblies for the tailgate permit the tailgate to be removed, and this has been accomplished in a known construction when the tailgate is pivoted to a position between the fully open or fully closed position. For example, the tailgate may include hinge pins that extend outwardly along the hinge axis that removably connect into brackets carried on the truck body. When the tailgate is pivoted to a predetermined intermediate position, for example, 15° away from a fully closed position, at least one of the hinge pins slips through a slot in the connecting bracket as the tailgate is lifted at one end from the truck body.

Some of the tailgate mounting assemblies include a spring bias assist for assisting movement and counterbalancing the weight of a tailgate during opening or closing movements. One previously known mechanism in which a torque rod provides spring biasing between the tailgate and the body panel pillars carries the torque rod on assemblies that form the pivots for the tailgate. Since the torque rod forms a portion of the pivot assembly, the torque rod must be installed for the tailgate to pivot and thus complicates the assembly procedure. Moreover, the torque rod may require particularly configured ends that complicate production of the parts before assembly.

A previously known tailgate assembly may use hinge pin trunnions for pivoting and the torque rod is pre-formed and installed into the tailgate in a complex and intricate procedure. For example, during assembly of the tailgate, the stationary end of the rod has to be aligned with an aperture that exposes the end for attachment outside of the tailgate while the anchoring end is aligned with a reinforcement plate located inside the tailgate. All of the aligning must be performed while the torque rod is carried within the interior of the tailgate and the procedure may be difficult and time consuming. Moreover, numerous components are required to assemble the torque rod to the tailgate. Other types of springs used in place of the torque rod are difficult to install within the confines of tailgates made of inner and outer panels joined together before the hinge assembly is mounted. Moreover, such assemblies may be difficult to repair, and replacement parts are complex and expensive.

BRIEF DESCRIPTION OF THE INVENTION

The present invention overcomes the above-mentioned disadvantages by providing a tailgate counterbalancing hinge assembly in a vehicle closure panel assembly that includes first and second end assemblies for pivotally supporting the closure panel adjacent to the vehicle's side panels and an axially elongated torque rod that is torsionally loaded to assist with the closure panel lift assist function, each of the end assemblies having a bushing carried by a mounting bracket attached to the tailgate and supported by keys attached to the vehicle body. The keys are aligned to define an initial installation position and a removal position for the closure panel.

Preferably, the first end assembly secures a first end of the torque rod to one of the vehicle's side panels, while pivotally supporting the closure panel at that same side panel. Preferably, the first end assembly includes a first mounting bracket that is secured to one of the vehicle's side panels with fasteners, although other methods of attachment may be used. The first mounting bracket includes an elongated key slot that receives an elongated key attached to a first bushing insert rotatably received in a first bushing attached to the closure panel. The first bushing insert includes an opening for receiving a complementary shaped end of the torque rod.

Preferably, a first tailgate bracket attaches to the closure panel with fasteners, although other methods of attachment may be used. The first tailgate bracket includes an opening, through which a stem of the first bushing is inserted and bent over. The first bushing is generally cylindrical and includes a cavity in which the first bushing insert is received.

Preferably, the second end assembly has an elongated key attached to a bracket mounted on a second body pillar for pivotally carrying the closure panel adjacent to the second body pillar. A second bushing insert has a slot configured for lateral reception of the key. The second bushing insert is received in a cavity in a second bushing that is mounted on a second tailgate bracket attached to the tailgate with fasteners or by other means.

Preferably, the torque rod is secured with a set screw at least one end, and preferably, has a faceted cross-section at least one end. The faceted cross-section can be any cross-section having at least one surface discontinuity that prevents rotation within a correspondingly shaped, compatible piece. The torque rod cross-section may be longitudinally continuous for ease of manufacture of the torque rod, or a faceted cross-section may be formed only on parts of the rod.

The present invention also comprises a method for assembling a removable closure panel to a vehicle body pillar at each end of the tailgate, wherein the hinge axis includes an axially elongated torque rod with bushing inserts carried in bushings held by brackets attached to the closure panel. At least end portions of the rod, preferably with a faceted cross-section are received in parts of the end assemblies. The method includes the steps of inserting the first end of the torque rod in a first bushing insert including a first chamber with a correspondingly faceted cross-section, inserting the first bushing insert into a first bushing fastened to the first end of the closure panel, inserting the second end of the torque rod in a second bushing attached to a second end of the closure panel and including a second chamber with a correspondingly faceted cross-section, inserting a second bushing insert with a laterally open slot into the second bushing, inserting a key attached to the first bushing insert into a key slot attached to the first body pillar, and sliding the second bushing insert slot over an aligned, elongated key attached to the second vehicle body pillar, and pivotally rotating the closure panel from a removal position to an open or closed position.

These and other features of the present invention can best be understood from the following specification and drawings, the following of which is a brief description.

BRIEF DESCRIPTION OF THE DRAWINGS

The various features and advantages of the present invention will become apparent to those skilled in the art from the following detailed description. The drawings that accompany the detailed description can be briefly described as follows.

DETAILED DESCRIPTION OF THE INVENTION

Figure 1:
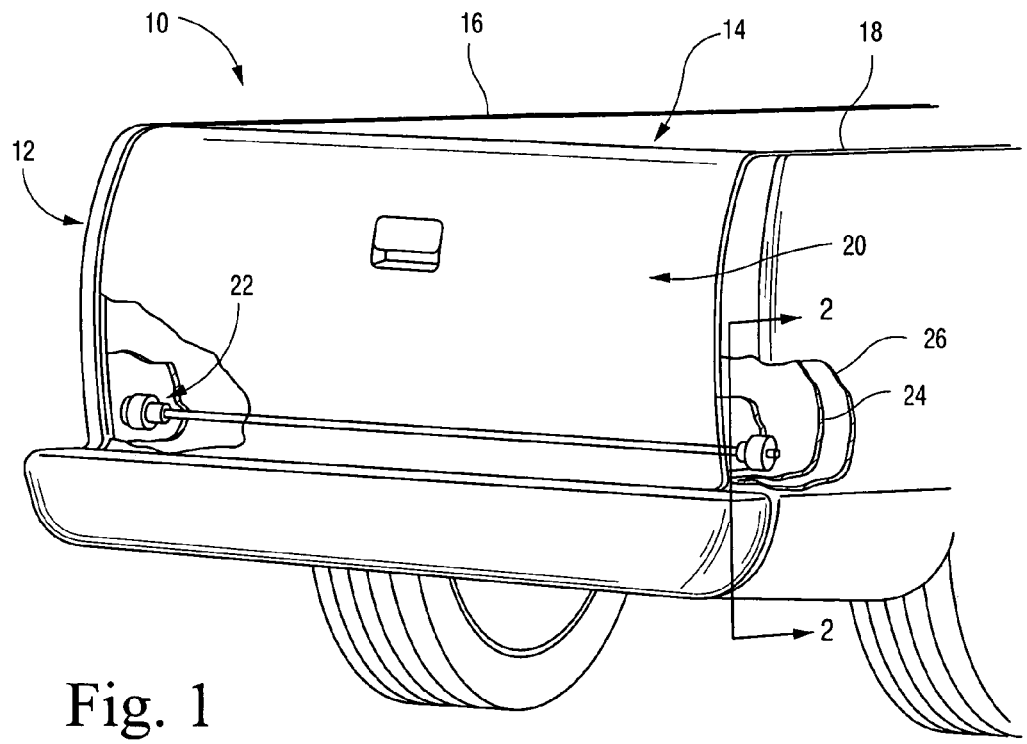
FIG. 1 shows a schematic view of a vehicle, a tailgate assembly and tailgate counterbalancing hinge assembly.

FIG. 1 illustrates a motor vehicle 10 including a vehicle body 12 with a rear compartment or bed 14 enclosed by a left sidewall 16, right sidewall 18, and a tailgate 20. A counterbalancing hinge assembly 22 pivotally supports the tailgate 20 between the left sidewall 16 and the right sidewall 18.

The tailgate 20 is pivotally supported between pillars formed by the sidewalls 16 and 18. Typically, as shown in the cutaway in FIG. 1, body panels such as the left sidewall 16 and right sidewall 18 and the tailgate 20 are formed by inner and outer panels 24 and 26, respectively, of sheet metal joined at the ends by overlapping flanges or the like that reinforce the planar expanses of the sheet metal forming the side panel. Of course, other materials may be used in constructing the vehicle body 12 and the counterbalance hinge assembly 22 without departing from the present invention. The present invention is not dependent upon the vehicle construction to which it may be applied, and may be installed in different brands and types of vehicles.

Figure 2:
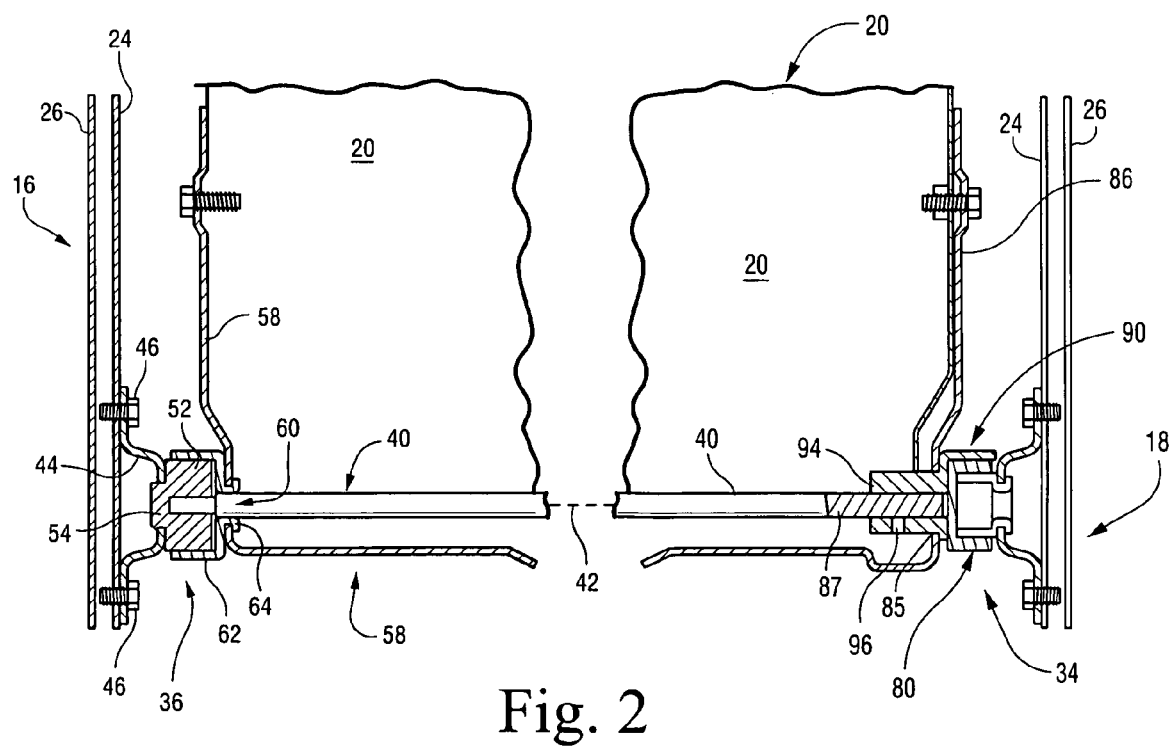
FIG. 2 is a sectional view taken through the tailgate assembly shown in FIG. 1 and showing the counterbalancing hinge assembly employed in the tailgate assembly of FIG. 1.
Figure 3:
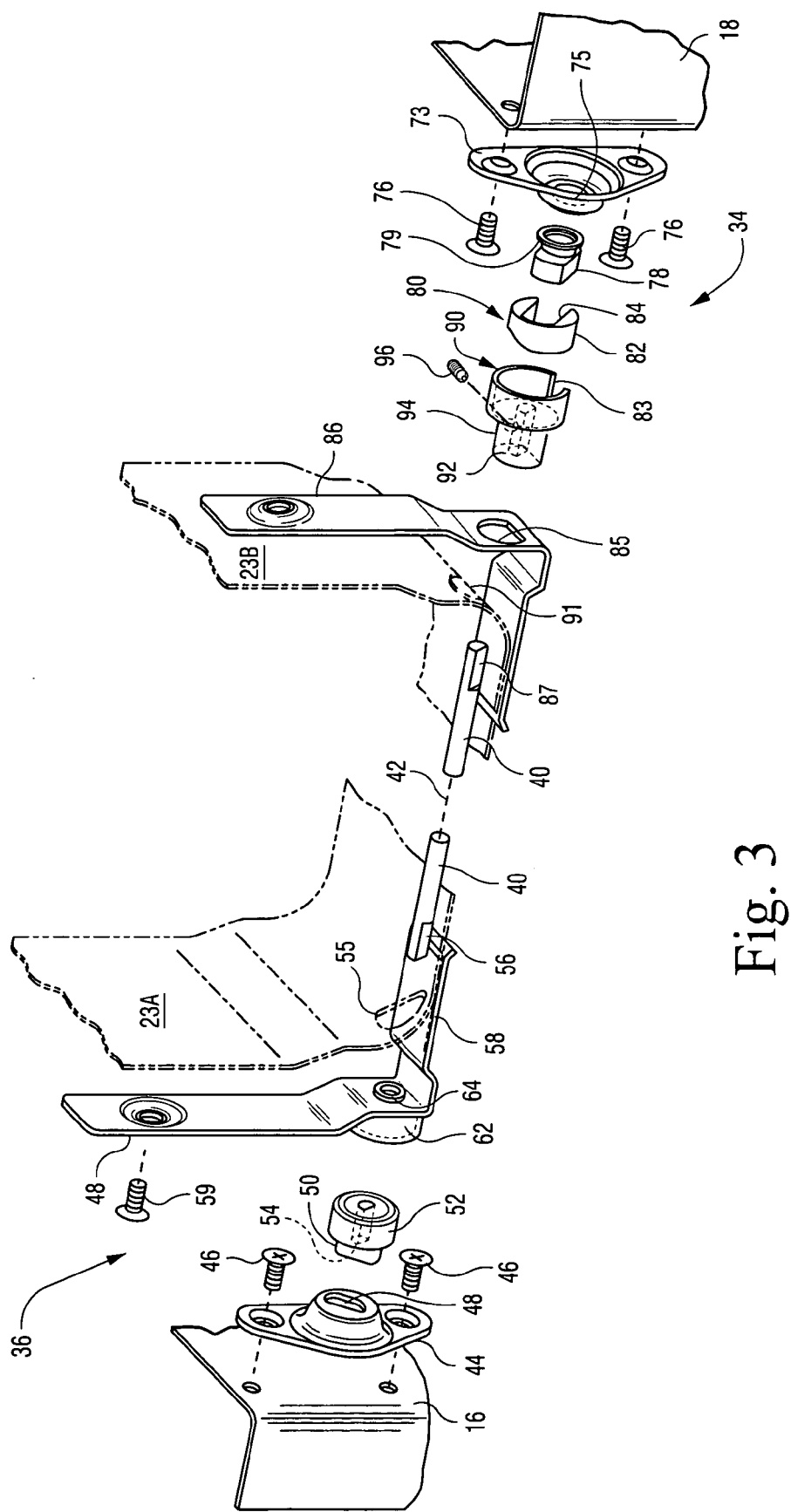
FIG. 3 is an enlarged exploded view of the counterbalancing hinge assembly employed in the tailgate assembly of FIGS. 1 and 2.

FIG. 2 illustrates a sectional view, while FIG. 3 illustrates an exploded view of counterbalancing hinge assembly 22. Counterbalancing hinge assembly 22 includes a first end assembly 36, a second end assembly 34, and an axially elongated torque rod 40 that is aligned along a pivot axis 42 between the left sidewall 16 and right sidewall 18 of vehicle 10 and attached to first and second end assemblies 36 and 34.

The first end assembly 36, shown in FIGS. 2 and 3, secures the torque rod 40 to the vehicle body 12 and pivotably supports the tailgate 20 at the left sidewall 16. It should be understood that, although reference is made to first end assembly 36 securing tailgate 20 to the left sidewall 16, first end assembly 36 may alternatively be secured to the right sidewall 18 in other embodiments of the invention. The first end assembly 36 includes a first mounting bracket 44 that is secured to the left sidewall 16 with fasteners 46, although other methods of attachment may be used, such as, but not limited to, welding. The first mounting bracket 44 includes an elongated key slot 48 that receives an elongated key 50 attached to a first bushing insert 52. The first bushing insert 52 includes a faceted opening 54 for receiving a correspondingly faceted end 56 of the torque rod 40. Left hand faceted end 56 of torque rod 40 can be locked in a faceted opening 54 first bushing insert 52 of first bushing 62 by a set screw (not shown), or by any other suitable means, such as a press fit.

A first tailgate bracket 58 attaches to the left end panel 23A of tailgate 20 with a fastener 59; however, additional fasteners, welding, or other methods of attachment may be used to secure the first tailgate bracket 58 to panel 23A of tailgate 20. The first tailgate bracket 58 also includes an opening 60, through which a first bushing 62 is preferably secured to the first tailgate bracket 58 by a stem 64 inserted into hole 60 and bent over, as shown in FIG. 2. Other methods of securing first bushing 62 to bracket 58 may be used. For example, first bushing 62 can be welded to the first tailgate bracket 58. The first bushing 62 is generally cylindrical and includes a cavity 66 in which the first bushing insert 52 is received. Faceted end 56 of torque rod 40 is inserted into faceted opening 54 of first bushing insert 52. Because first bushing 62 is positioned generally coaxially with respect to opening 60, the faceted end 87 of torque rod 40 is then passed through opening 60 and a co-axial opening 55 of end panel 23A of tailgate 20, and inserted into tailgate 20.

Referring again to FIGS. 2 and 3, second end assembly 34 secures torque rod 40 to tailgate 20, while also pivotably supporting tailgate 20 at the right side panel 18, as shown in FIG. 2. Second end assembly 34 includes a second bushing 90 having a stem 94 for attachment to a second tailgate bracket 86, and a second bushing insert 80, which is pivotally or rotatably inserted into second bushing 90.

Second bushing 90 stem 94 preferably has a bore 92 that is adapted to receive, preferably in a press fit, faceted fit, or otherwise securing engagement, a right end 87 of torque rod 40. Second bushing 90 is mounted within an opening 85 of second tailgate bracket 86. Preferably, opening 85 is formed in bracket 86 and aligned with a larger opening 91 in tailgate end 23B. Preferably, stem 94 of second bushing 90 is locked in correspondingly configured opening 85 of second tailgate bracket 86. Stem 94 may be, for example, semi-cylindrical, whereby the configuration of opening 85 is also semi-cylindrical to non-rotatably retain pivot bushing 90 in end bracket 86. Second bushing 90 may also be retained in opening 85 by a retainer engaging stem 94.

Bushing insert 80 is inserted within pivot bushing 90, and includes a cylindrical body surface 82 that engages the interior of second bushing 90, and a radial slot 84 that interrupts body surface 82 and that is aligned with a slot 83 cut in the body of second bushing 90.

Second end assembly 34 also includes a second key 78 that is received in slot 83 of second bushing 90 and in slot 84 of second bushing insert 80. As shown in FIG. 3, second key 78 includes a threaded stem 79 that is received in a threaded opening 75 of a second mounting bracket 73 and attached to bracket 73 by means of a nut. Stem 79 can also not be threaded, whereby it is attached to bracket 73 by the formation of a flange on the stem similar to the way first bushing 62 is attached to bracket 58. Second mounting bracket 73 is then fastened to right side panel 18 of vehicle 10. Preferably, second mounting bracket 73 is screwed to side panel 18 by screws 76; however, it should again be noted that other attachment means, such as bolts or welding, can be used without departing from the present invention.

Preferably, stem 94 of second bushing 90 is correspondingly sized to fit in opening 85 of second tailgate bracket 86, which, in turn, is attached to the end panel 23B of tailgate 20 over an opening 91 (FIG. 3) in end panel 23B. Opening 91 is enlarged to receive stem 94 of bushing 90 to retain the right end 87 of torque rod 40 with respect to tailgate 20. Right hand end 87 of torque rod 40 is preferably locked in bore 92 in stem 94 of second bushing 90 by a set screw 96. The rigid connection of torque rod 40 to second bushing 90 is made so that torque rod 40 moves with tailgate 20 as tailgate 20 is rotated. Thus, as tailgate 20 is rotated between an upright, closed position and a horizontal, open position, torque rod 40 is forced to twist with tailgate 20's movement. Preferably, the unbiased position of torque rod 40 occurs when tailgate 20 is aligned with the elongated axis of right hand key 78, whereby spring tension is introduced to pivot the tailgate 20 away from the closed position when it is unlatched, and to raise it to the closed position when it has been unlatched from its open position. The latching of tailgate 20 in both the closed and the open positions could be done in a well known manner without departing from the present invention. For example, over-center locking arms at the end of tailgate 20 may be used at the open position of tailgate 20.

The parts of hinge assembly 22 can be positioned and assembled before spring tension is applied to torque rod 40. First, first and second bushings 62 and 90 are attached to first and second tailgate brackets 58 and 86, and the brackets are attached to tailgate 20, preferably by bolts or welding, so that configured openings 60 and 85 in brackets 58 and 86 are aligned over openings 55 and 91 in the ends 23A and 23B of tailgate 20. Preferably, this enables configured openings 60 and 85 to be sized, shaped and positioned after tailgate 20 has been manufactured. This overcomes the difficulty of shaping, sizing and aligning the apertures of the original tailgate panel stampings. Set screw 96 is initially installed in a pre-production or fabrication assembly procedure, and left loose for tightening at the assembly plant. Torque rod 40, carrying pivot body 52 at end 56, is positioned so that end 87 of torque rod 40 is inserted through openings 60 and 55 to extend through tailgate 20. Torque rod 40 is inserted through bushing 90, already attached, for example, by welding or mechanical connection, to bracket 86 in a prior, pre-production or fabrication operation. The preferred mechanical connection may expand or turn the stem walls beyond the perimeter of opening 85 receiving stem 94. Set screw 96 is then tightened after end 87 of torque rod 40 is inserted into bore 92 in stem 94 of bushing 90.

The tailgate is then positioned for installation on the vehicle 10. The elongated key slot 48 of first mounting bracket 44, which is for example angled 10° open, receives the elongated key 50 of first bushing 52. Then tailgate 20, which is supported by pivot body 52 being inserted into first bushing 62, is pivoted to an intermediate angle, for example 45° towards open relative to the vertical position, to align the elongated slot 84 of the pivot coupling 80 in the second bushing 90 with the elongated key 78 attached to second mounting bracket 73. The tilted tailgate 20 is then lowered to engage the elongated key 78 into the elongated slot 84.

The assembly discussed above provides a mechanism for removably mounting a closure member, such as tailgate 20, between spaced apart body side panels, such as side panels 16 and 18, of a vehicle body using an improved hinge assembly including a linear torque rod extending between the lateral ends of the tailgate. The torque rod is twisted in tension when the tailgate is pivoted to either the closed or open positions from the removal position. This tension provides a counterbalancing effort to assist with pivotal movement of the tailgate. The end assemblies 36 and 34 provide means for connecting the torque rod in driving engagement between the vehicle body and the tailgate while rotatably supporting the tailgate. The present invention includes a bushing attached to a closure member that is received laterally and downwardly over a pin mounted on the vehicle body when the closure member is in the removal position. Accordingly, the torque rod is twisted in tension when the closure member is pivoted to either the closed or open positions from the removal position. This tension provides a counterbalancing effort to assist with pivotal movement of the closure member. Nevertheless, the assembly permits facile removal of the closure member from the vehicle body when the closure member is in the removal position.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mechanism for removably mounting a closure member between spaced apart first and second body side panels of a vehicle body for movement about a pivotal axis of said closure member between open, closed and removal positions, the mechanism comprising:

a first end assembly for pivotably supporting a first side of the closure member at the first side panel of the vehicle body, a second end assembly for pivotably supporting a second side of the closure member at the second side panel of the vehicle body, an axially elongated torque rod having a first end connected to the first end assembly and a second end connected to the second end assembly, the first end assembly securing the first end of the torque rod to the vehicle body, the second end assembly securing the second end of the torque rod to the closure member, the first end assembly including a first bracket with an elongated key slot mounted on the first side panel of the vehicle body and a first elongated key mounted on a first end of the closure member for insertion into the elongated key slot, and the second end assembly including a second bracket with a second elongated key mounted on the second side panel of the vehicle body and a bushing assembly mounted on a second end of the closure member and including a laterally open slot to permit said bushing assembly to laterally engage the second elongated key when the closure member is in the removal position, the torque rod being twisted in shear when the closure member is pivoted to either the closed or open positions from the removal position, thereby providing a counterbalancing effect to assist with pivotal movement of the closure member, and permitting facile removal of the closure member from the vehicle body when the closure member is in the removal position.

2. A hinge assembly for removably mounting a closure member between spaced apart first and second side panels of a vehicle body for movement about a pivotal axis of said closure member between open, closed and removal positions, the hinge assembly comprising:

first and second hinge brackets secured to first and second ends, respectively, of the closure member, first and second bushings mounted on the first and second hinge brackets, respectively, the first and second bushings having pivotal axes that are coincident with the axis of pivotal movement of said closure member, a first mounting bracket secured to the first vehicle side panel, the first bracket including an elongated key slot, a first bushing insert rotatably inserted in the first bushing and including a first elongated key for insertion into the elongated key slot, a second mounting bracket secured to the second vehicle side panel, the second bracket including a second elongated key, a second bushing insert rotatably inserted in the second bushing, the second bushing insert and second bushing including a laterally open slot therein to permit the second bushing insert to laterally engage the second elongated key when the closure member is in the removal position; and an axially elongated torque rod having a first end connected in driving engagement to the vehicle body through the first bushing insert and a second end connected in driving engagement to the closure member through the second bushing, the torque rod being twisted in tension when the closure member is pivoted to either the closed or open positions from the removal position, thereby providing a counterbalancing effect to assist with pivotal movement of the closure member, and permitting facile removal of the closure member from the vehicle body when the closure member is in the removal position.

3. The hinge assembly of claim 2, wherein the second end of the torque rod has a faceted cross-section and the second bushing has a complementary faceted chamber for securely receiving the faceted end of the torque rod.

4. The hinge assembly of claim 3, wherein the faceted torque rod end and the faceted chamber are polygonal shaped for locked engagement with one another.

5. The hinge assembly of claim 3, wherein the faceted torque rod end and the faceted chamber are semicircular shaped for locked engagement with one another.

6. The hinge assembly of claim 2, wherein the torque rod is secured with a set screw at at least one end.

7. The hinge assembly of claim 1, wherein the torque rod is secured with set screws at each of its ends.

8. The hinge assembly of claim 3, wherein the faceted torque rod is secured with a set screw.

9. A tailgate counterbalancing hinge comprising:

a first end assembly with a first support for pivotally carrying a tailgate adjacent to a first vehicle body panel, the first support comprising a mounting bracket with a seat and a first bushing insert pivotally received by a first bushing attached to the tailgate and including a stem for locking the first bushing insert with respect to the vehicle;

a second end assembly with a second support for pivotally carrying the tailgate adjacent to a second vehicle body panel opposed to the first body panel, the second support comprising a key with a mount for securing said key to said second body panel, a second bushing insert having a slot aligned for reception of said key, and a second bushing received in an opening in the tailgate and carrying the second bushing insert; and a torque rod having a first end secured with respect to the first bushing insert and a second end secured for movement with the second bushing insert for movement with the second bushing insert.

10. The tailgate counterbalancing hinge of claim 9, wherein the second end of the torque rod has a faceted cross-section and the second bushing has a complementary faceted chamber for securely receiving the faceted end of the torque rod.

11. The tailgate counterbalancing hinge of claim 10 wherein the faceted cross-section is polygonal shaped.

12. The tailgate counterbalancing hinge of claim 9 wherein the torque rod is secured in the second bushing by a set screw.

13. The tailgate counterbalancing hinge of claim 9 wherein the torque rod is secured in the first bushing insert by a set screw.

14. The tailgate counterbalancing hinge of claim 10 wherein the faceted cross-section is semicircular shaped.

15. A vehicle body comprising:

a bed, first and second pillar structures on first and second sides, respectively, of said bed, a tailgate, and a hinge structure pivotally and removably supporting the tailgate at the first and second pillars, the hinge structure comprising:

a first end assembly comprising a first support for pivotally carrying the tailgate adjacent to the first body pillar, the first support comprising a first bushing attached to the tailgate, a first mounting bracket secured to the first body pillar including a slot, and a first bushing insert rotatably received within the first bushing and including a first elongated key aligned for insertion in the slot to secure the first bushing insert with respect to the vehicle body, and a second end assembly comprising a second support for pivotally carrying the tailgate adjacent to the second body pillar, the second support including a second bushing attached to the tailgate, a second bushing insert rotatably received within the second bushing, and a second mounting bracket including a second elongated key, the second bushing including a stem for locking the second bushing with respect to the tailgate, the second bushing insert including a slot for laterally receiving the second elongated key, a torque rod including a first end secured with respect to the first bushing insert and a second end secured for movement with the second bushing insert.

16. The vehicle body of claim 15, wherein the second end of the torque rod has a faceted cross-section and the second bushing has a complementary faceted chamber for securely receiving the faceted end of the torque rod, and wherein the faceted torque rod is secured with a set screw within said pivot bushing.

17. A method for assembling a selectively removable tailgate with a hinge structure to first and second vehicle body pillars positioned adjacent to first and second ends of the tailgate, the hinge structure including a torque rod with first and second ends having faceted cross-sections, the method comprising the steps of:

inserting the first end of the torque rod in a first bushing insert including a first chamber with a correspondingly faceted cross-section, inserting the second end of the torque rod into a first bushing fastened to the first end of the tailgate, and through the tailgate, whereby the first bushing insert is inserted into the first bushing, inserting the second end of the torque rod in a second bushing attached to a second end of the tailgate and including a second chamber with a correspondingly faceted cross-section, inserting a second bushing insert with a laterally open slot into the second bushing, inserting a key attached to the first bushing insert into a key slot attached to the first body pillar, and sliding the second bushing insert slot over an aligned, elongated key attached to the second vehicle body pillar, and pivotally rotating the tailgate from a removal position to an open or closed position.

18. The method of claim 17 further comprising the step of fastening the first and second bushings to the first and second ends of the tailgate by installing first and second brackets having openings in the first and second ends of the tailgate, and inserting the bushings in said openings.

19. The tailgate counterbalancing hinge of claim 3, wherein the torque rod faceted cross-section has a cross-section having at least one surface discontinuity that prevents rotation within a correspondingly shaped, compatible bushing.

20. The tailgate counterbalancing hinge of claim 3, wherein the torque rod faceted cross-section is longitudinally continuous for ease of manufacture of the torque rod.

21. The tailgate counterbalancing hinge of claim 3, wherein the torque rod faceted cross-section is formed on only a part of the torque rod.

22. The assembly of claim 2, wherein the first and second mounting brackets are secured to the sidewalls with a plurality of fasteners.

23. The assembly of claim 2, wherein the first and second mounting brackets are secured to the sidewall by welding.

* * * * *